Feb. 24, 1925.

J. KAUPERT 1,527,309

AUTOMOBILE SAFETY DEVICE

Filed April 4, 1924     2 Sheets-Sheet 1

Witnesses:

Inventor:
Joseph Kaupert
His Attorney.

Feb. 24, 1925.  
J. KAUPERT  
1,527,309  
AUTOMOBILE SAFETY DEVICE  
Filed April 4, 1924  
2 Sheets-Sheet 2

Witnesses:

Inventor:
Joseph Kaupert
His Attorney.

Patented Feb. 24, 1925.

1,527,309

UNITED STATES PATENT OFFICE.

JOSEPH KAUPERT, OF CHICAGO, ILLINOIS.

AUTOMOBILE SAFETY DEVICE.

Application filed April 4, 1924. Serial No. 704,164.

*To all whom it may concern:*

Be it known that I, JOSEPH KAUPERT, a citizen of the United States, and a resident of the city of Chicago, county of Cook, and State of Illinois, have invented certain new and useful Improvements in Automobile Safety Devices, of which the following is a specification.

My invention pertains to an automobile safety device, and has for an object to provide a safety device for an automobile which will receive and move a person or object, and will thus positively prevent persons from being run over by the automobile and injured in that manner. Another object is to provide resilient means on said device to permit it to descend entirely to the ground when a person or object comes forcibly against said device. And another object is to provide such a device which is automatically operable with the operation of the brake pedal.

Other objects will appear hereinafter.

The invention consists in the combinations and arrangements of parts hereinafter described and claimed.

The invention will be best understood by reference to the accompanying drawings forming a part of this specification, and in which—

Figure 1:
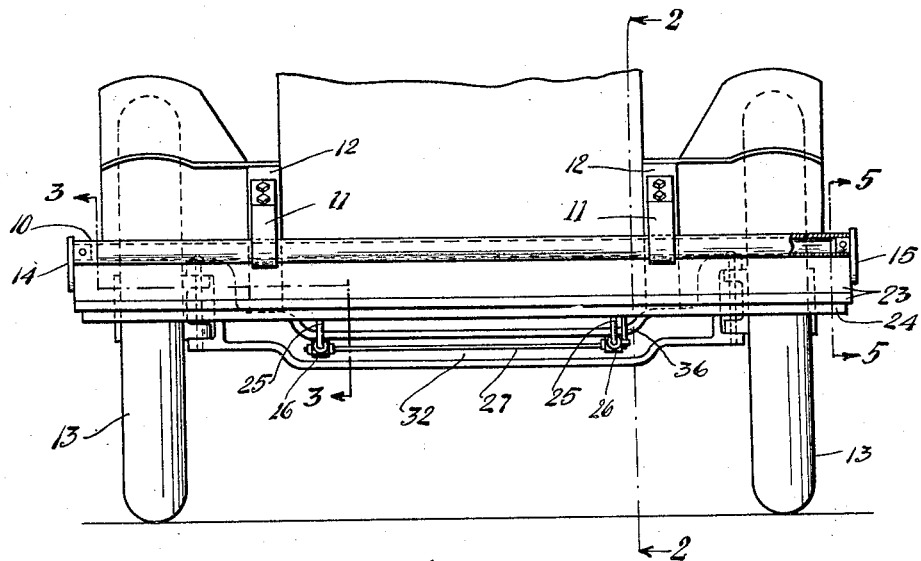
Fig. 1 is a partial front elevation of an automobile, showing my invention mounted in position thereon.

The preferred form of construction illustrated comprises a supporting bar 10 mounted with bracket arms 11 on the frame members 12 of an automobile, and extending across the front of the wheels 13, substantially in the position of the usual bumper bar and taking the place thereof. Arms 14 and 15 are fastened to the opposite ends of said bar 10, and a roller 16 is mounted with a pin 17 at one end and a flat pin 18 at the other end in openings in the end members or caps 19 and 20 respectively on said arms 14 and 15. Flexible means 21 is fastened with one end on said roller and consists preferably of strong canvas or some flexible or pliable material, a spring 22 being provided in the roller to normally rotate said roller and wind the flexible means 21 thereon, into the position shown in the drawings. A hood or covering member 23 is mounted on the end members 19 and 20 for covering said flexible means and roller; and a reenforcing member 24 is fastened to the lower edge of the flexible means 21, said member being substantially rigid and preferably of metal.

Means is provided for bracing said reenforcing member 24 and for moving the same with the flexible means or member upward and downward. This means preferably comprises a plurality of rods 25 fastened at their front ends with screws 25' against said member 24, and provided at their rear ends with bracket portions 26 which are secured to a cross rod 27, as with pins 28, the ends of said rod being rotatable in the forked ends 29 of bracket members 30 fastened with bolts 31 or similar means to the web of the front axle 32.

Means is provided for operating the device with the operation of the usual brake pedal. This means includes a wire member or rod 33 fastened with its inner end to the brake pedal 34 above the fulcrum point 35 thereof, and fastened with its other end to a finger 36 extending upwards from a lug 37 on the bracket portion 26 of the brace rod 25. A resilient member or spring 38 is interposed in operating rod 33, as shown in Fig. 2.

Figure 2:
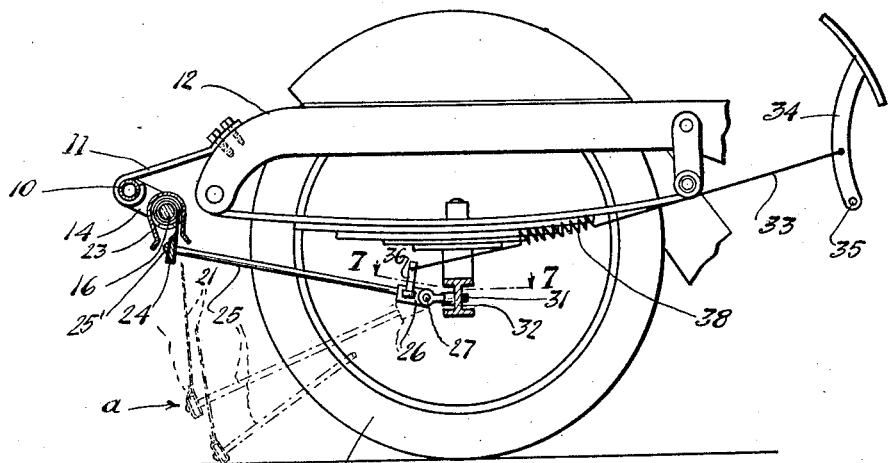
Fig. 2 is a vertical cross section of the construction, taken on the line 2—2 of Fig. 1.
Figure 3:
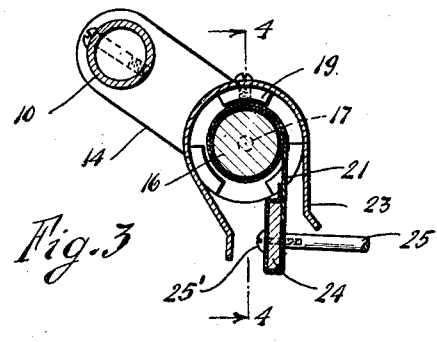
Fig. 3 is an enlarged cross section taken on line 3—3 of Fig. 1.
Figure 4:
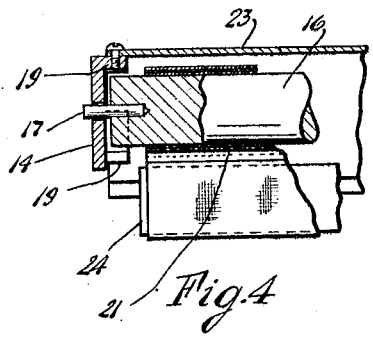
Fig. 4 is a vertical section taken on line 4—4 of Fig. 3.
Figure 5:
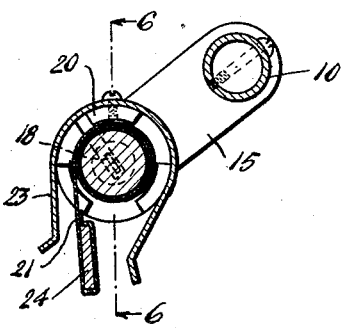
Fig. 5 is an enlarged vertical section taken on line 5—5 of Fig. 1.
Figure 6:
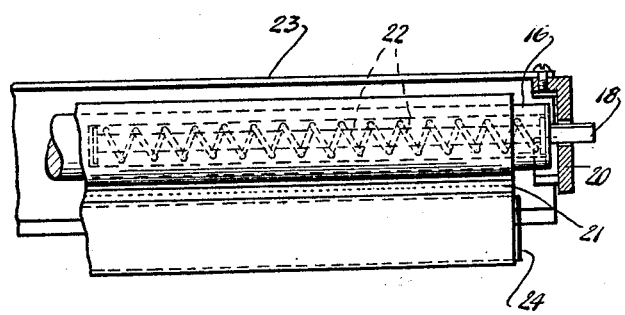
Fig. 6 is a vertical section taken on line 6—6 of Fig. 5.
Figure 7:
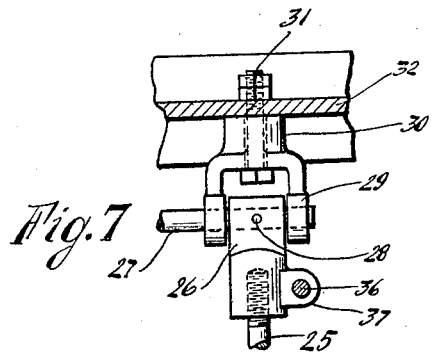
Fig. 7 is an enlarged horizontal section taken on line 7—7 of Fig. 2.

The entire construction is arranged, that when the brake pedal 34 is moved forward into braking position, the weight of rods 25 and bar 24 will be sufficient to automatically move said bar 24 with the pliable means 21 downwardly, by the force of gravity, and extending said pliable means or unrolling it against the tension of spring 22, until it assumes the intermediate position (*a*) indicated in dotted lines in Fig. 2, located a few inches above the ground. When a person or object comes into contact with the pliable means 21 or rod 24 the spring 22 will yield an additional amount and the spring 38 in rod 33 will be extended, thus permitting bar 24 to descend entirely down to the ground, as indicated in the lowermost dotted lines in Fig. 2. When the brake pedal is released, and the usual brake release spring draws the brake pedal upwards and backwards, then the members 24 and 25 are drawn upwardly and the canvas or pliable means 21 is again rolled upon the roller by means of spring 22, into the full line positions shown in the drawings.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. A safety device comprising means mounted on the front of a vehicle and extendible across the front thereof, re-enforcing means mounted on said extendible means, and means for raising said re-enforcing means and extendible means with the brake pedal when it is moved to release position, said device being arranged for automatically lowering said re-enforcing and said extendible means by the force of gravity when the brake pedal is moved to on position.

2. A safety device comprising flexible means mounted on a vehicle and extendible across the front thereof, tension means for supporting and for lowering said extendible means nearly to the ground, and resilient means in said tension means to permit said extendible means to descend entirely to the ground when it is forcibly engaged by an object.

3. A safety device comprising means mounted on a vehicle and extendible across the front thereof, means connected to the brake pedal for extending and lowering said extendible means nearly to the ground, and for raising said extendible means, and resilient means in said connecting means to permit said extendible means to descend entirely to the ground when it is forcefully engaged by a person.

4. A safety device comprising flexible means mounted on the front of a vehicle, a re-enforcing member at the lower end of said means, means including a tension rod connected to the brake pedal for raising said extendible means and member and for lowering it to a position near the ground, and a spring in said tension rod to permit said member and means to descend entirely to the ground.

5. A safety device comprising a roller rotatably mounted on the front of an automobile, flexible means windable on said roller, means in said roller to automatically wind up said flexible means thereon, and means including pivoted brace rods connected to said flexible means and to the brake pedal and which by their weight automatically unroll and move said flexible means down toward the ground when said brake pedal is moved to on position.

6. A safety device comprising a roller rotatably mounted on the front of an automobile, canvas means windable on said roller, means in said roller to automatically wind up said canvas means thereon, means connected to said canvas means and to the brake pedal to move by gravity to automatically unroll and move said canvas means down toward the ground when said brake pedal is moved to on position, and a hood for covering said roller and canvas means.

7. A safety device comprising a bumper bar extending across the front of an automobile and mounted on the frame members thereof, a roller in bracket arms on said bar, flexible means mounted on said roller and windable thereon, a re-enforcing member on said flexible means, brace rods extending from said re-enforcing means and swingably mounted on the front axle, and tension means connecting said rods with the brake pedal for raising said device and to permit the weight of said reinforcing member and said brace rods to unroll said flexible means.

In testimony whereof I have signed my name to this specification in the presence of two subscribing witnesses.

JOSEPH KAUPERT.

Witnesses:
 FREDA C. APPLETON,
 MARGARET AUER.